(12) United States Patent
Arguelles et al.

(10) Patent No.: US 7,823,138 B2
(45) Date of Patent: Oct. 26, 2010

(54) DISTRIBUTED TESTING FOR COMPUTING FEATURES

(75) Inventors: Carlos A. Arguelles, Shoreline, WA (US); Gustavo Gallegos, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 1016 days.

(21) Appl. No.: 11/599,022

(22) Filed: Nov. 14, 2006

(65) Prior Publication Data

US 2008/0115107 A1    May 15, 2008

(51) Int. Cl.
G06F 9/44 (2006.01)
G06F 11/00 (2006.01)

(52) U.S. Cl. .............. 717/131; 717/125; 717/126; 714/38; 714/100

(58) Field of Classification Search ......... 717/124–135; 714/38, 100
See application file for complete search history.

(56) References Cited

U.S. PATENT DOCUMENTS

| | | | |
|---|---|---|---|
| 6,292,781 B1 | 9/2001 | Urs | 704/270.1 |
| 6,633,846 B1 | 10/2003 | Bennett | 704/257 |
| 6,662,217 B1 * | 12/2003 | Godfrey et al. | 709/219 |
| 7,020,574 B2 * | 3/2006 | Eden et al. | 702/122 |
| 7,055,137 B2 * | 5/2006 | Mathews | 717/125 |
| 7,076,428 B2 | 7/2006 | Anastasakos | 704/270.1 |
| 7,092,871 B2 | 8/2006 | Pentheroudakis | 704/9 |
| 7,178,063 B1 * | 2/2007 | Smith | 714/38 |
| 7,673,180 B1 * | 3/2010 | Chen et al. | 714/38 |
| 2003/0061030 A1 | 3/2003 | Kuboyama | 704/9 |
| 2003/0131285 A1 * | 7/2003 | Beardsley et al. | 714/38 |
| 2004/0003068 A1 * | 1/2004 | Boldman et al. | 709/223 |
| 2004/0024583 A1 | 2/2004 | Freeman | 704/4 |
| 2005/0114737 A1 * | 5/2005 | Hughes et al. | 714/38 |
| 2006/0149549 A1 | 7/2006 | Napper | 704/257 |
| 2007/0038982 A1 * | 2/2007 | Andrews et al. | 717/124 |

OTHER PUBLICATIONS

Cleve et al., "Locating Causes of Program Failures"; ACM, 2005; 9pg.*
Hildebrandt et al., "Simplifying Failure-Inducing Input"; ACM, 2000; 10pg.*

(Continued)

*Primary Examiner*—Wei Y Zhen
*Assistant Examiner*—Ryan D Coyer
(74) *Attorney, Agent, or Firm*—Joseph K. Kelly; Westman, Champlin & Kelly, P.A.

(57) ABSTRACT

A new method is provided for using distributed computing for computing process testing. The method includes distributing a feature testing tool, computing feature builds, and data sets to client computing systems. The feature testing tool is run on the client computing systems during times when the client computing system is not otherwise in active use. The feature testing tool prompts the computing feature build to process the data sets, and collects results from the processing of the data set, including any erroneous results. The results from processing the data sets on the client computing systems are provided to a managing computing system. The managing computing system may try to reproduce the erroneous results on other client computing systems with alternate hardware-software configurations, to send erroneous results to an investigation queue to isolate their cause, and to report useful information on the erroneous results to developers working on the computing feature.

18 Claims, 5 Drawing Sheets

OTHER PUBLICATIONS

"A Distributed Multi-Agent Architecture for Natural Language Processing" by Danilo Fum, Giovanni Guida and Carlo Tasso, International Conference on Computational Linguistics Proceedings of the 12th conference on Computational Linguistics—vol. 2, Budapest, Hungrey, pp. 812-814, 1988, ISBN:963 8461 56 3.

"A Flexible Distributed Architecture for Natural Language Analyzers" by Xavier Carreras and Lluís Padró, Conference on Language Resources and Evaluation (LREC'02). Las Palmas de Gran Canaria, Spain. 2002.

International Search Report and Written Opinion of PCT/US2007/083652 filed on Nov. 5, 2007.

X. Bai et al., "Distributed End-to-End Testing Management", Proceedings of the 5th IEEE International Conference on Enterprise Distributed Object Computing, Sep. 2001.

* cited by examiner

DISTRIBUTED TESTING FOR COMPUTING FEATURES

BACKGROUND

As the availability and effectiveness of computing power have proliferated, so have the demands for more computing power, to pursue a considerable variety of ambitious goals. One means that has been used for achieving greater computing power is distributed computing, in which a demanding computing task is broken up into smaller jobs that are distributed to a group of computers, which report back their results to be compiled into a single set of results.

The discussion above is merely provided for general background information and is not intended to be used as an aid in determining the scope of the claimed subject matter.

SUMMARY

New ideas have been devised for using distributed computing for testing and proofing computing processes, such as applications that are expected to perform a great deal of computing with a maximum of accuracy and effectiveness in very complex tasks, but for which a great need exists to develop and release the applications quickly. This is the case, for instance, with many Natural Language (NL) features that perform natural language processing tasks.

One illustrative embodiment pertains to a method. The method includes distributing a feature testing tool to client computing systems, and distributing computing feature builds and data sets from a managing computing system to the client computing systems. The feature testing tool is run on a given client computing system during times when the feature testing tool determines that client computing system is not otherwise in active use. The feature testing tool prompts the computing feature build to process one of the data sets, and collects results from the processing of the data set, including any erroneous results. The results from the computing feature build processing the data sets on the client computing systems are provided to the managing computing system. Further steps may be taken to test for erroneous results on client computing systems with alternate hardware-software configurations, to send characterized erroneous results to an investigation queue to isolate their cause, and to report useful information on the erroneous results to developers working on the computing feature, for example.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

As stated above, various embodiments use distributed computing for testing and proofing computing processes, such as applications that are expected to perform a great deal of computing with a maximum of accuracy and effectiveness in very complex tasks, but for which a great need exists to develop and release the applications quickly. One good example of this is developing Natural Language (NL) features that perform natural language processing tasks. This example is discussed further as follows.

Natural language processing includes parsing and/or understanding human languages by computing devices. This may include human languages entered as text, or converted from voice input, for example. Natural language features are used to perform a wide variety of natural language processing tasks with samples of human language, which are very complex and challenging to deal with. Natural language features are expected to be able to deal with correct and incorrect samples of human language usage, meaning the potential inputs and combinations of inputs is indefinitely large. Furthermore, a great many natural languages are used, and natural language features are needed to perform a wide variety of functions in a large number of different natural languages, and even perform natural language tasks that cross between multiple natural languages, such as multilingual translation. To make matters still more complex, natural language features may be called upon to deal with human language inputs in any of a great variety of software applications, which may be combined with any combination of computing hardware, operating system, concurrently running software, and other computing system factors that influence or have the potential to influence the operation of a natural language feature or the software applications with which it is interfacing.

The combination of a large number of different natural language features, that must be deployed in a large number of languages, each combination of which must be individually tailored in an effort-intensive development program, that must also ensure compatibility across a wide variety of hardware and software configurations, makes for a very large number of natural language tasks to perform. Additionally, such features must be assured of a high degree of accuracy, and they typically must be developed and released quickly. Yet, assurance of a high degree of accuracy in such a complex task typically requires extensive iterative testing to ensure proper functioning. Natural language processing features are therefore one ideal example of computing processes for which various embodiments of the subject matter herein constitute effective and much needed development tools.

Figure 1:
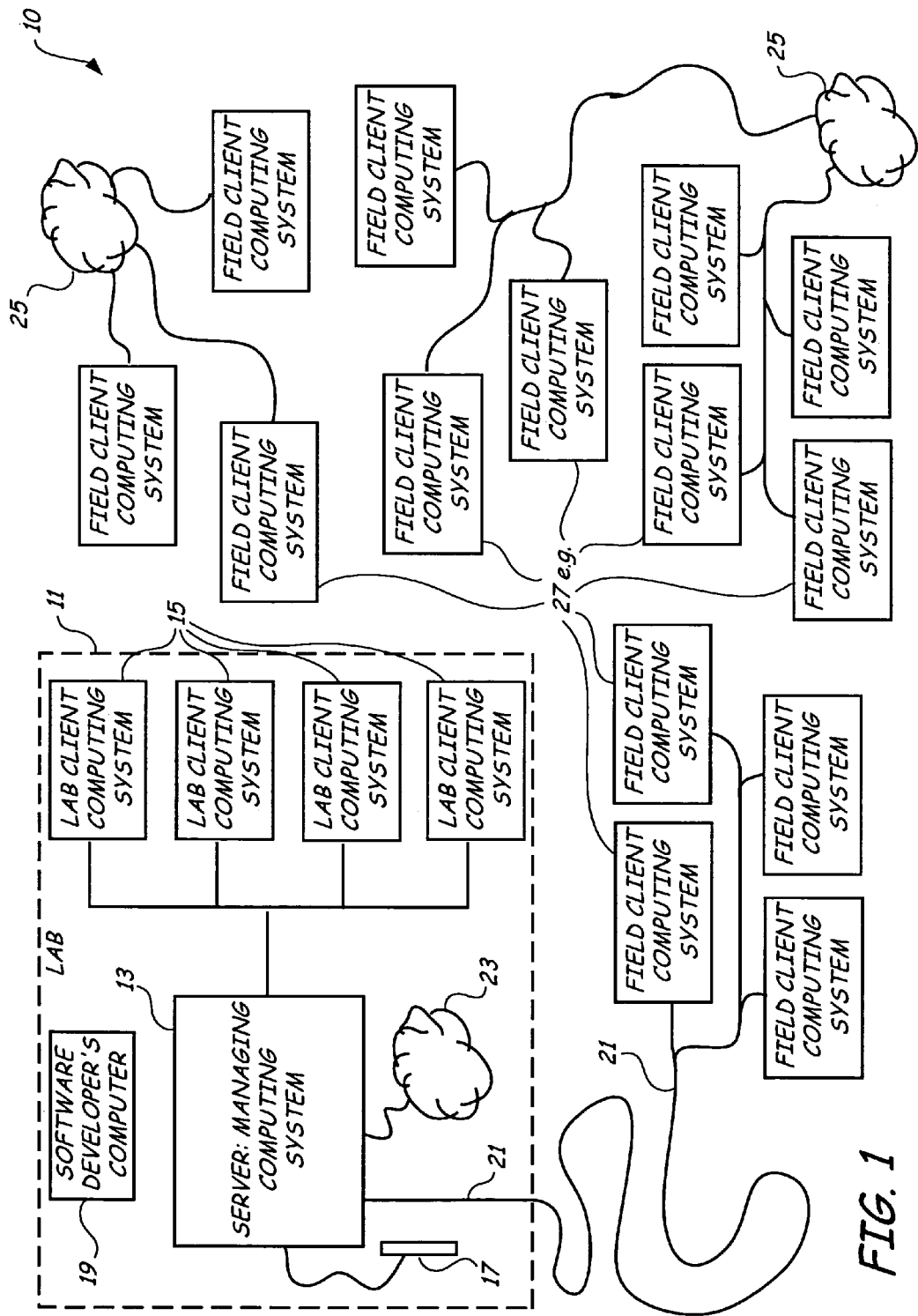
FIG. 1 depicts a block diagram of a system of computing systems, including a managing computing system and a plurality of distributed client computing systems, according to an illustrative embodiment.

FIG. 1 depicts an illustrative context for distributed computing for testing computing processes, such as those involved in natural language features, according to an illustrative embodiment. FIG. 1 depicts a block diagram of a system 10 of computing systems, including a managing computing system 13 and a plurality of distributed client computing systems 15, 27, according to one illustrative embodiment. System 10 depicts embodiments that include computing systems, and executable instructions configured to be executed by computing systems, and contexts that enable inventive method embodiments, for example. The following discussion provides further details of illustrative embodiments.

System 10 includes a lab 11. Lab 11 includes a server, that acts as a managing computing system 13. Lab 11 also includes several lab client computing systems 15 in communicative connection with server 13. Lab client computing systems 15, and other computing systems or computing devices discussed herein, may for example include desktop computers, laptop and notebook computers, PDAs and other portable computing devices, other servers, or a variety of other computing devices, systems, environments, and/or components. Some computing systems may be referred to as a computing device, a computer, a mobile device, etc., with the understanding that such mentions refer to special case examples that may be used for computing systems, and that the term "computing system" is used as a shorthand way of referring to any kind of computing device, system, or environment. These are discussed further, for example, with reference to FIGS. 4 and 5, below. A typical lab may include tens, hundreds, or more computing devices that may be dedicated to a computing process the lab is interested in.

Lab 11 also includes a wireless hub 17; an illustrative software developer's computer 19 in communicative wireless connection with server 13 via wireless hub 17; a local area network (LAN) connection 21; and an Internet connection 23. LAN connection 21 connects server 13 with a number of field client computing systems 27. A selected number of the field client computing systems are indicated in FIG. 1 by the reference label "27 e.g." to indicate that the indicated icons are examples (exempli gratia) of the total number of depicted field client computing systems that are also intended to be referred to by the reference label 27. While illustratively labeled a LAN, lab 11 might also be connected to any other scale of network, including personal area networks, campus area networks, metropolitan area networks, wide area networks, and so forth. Internet connection 23 connects with other Internet nodes 25, which may be anywhere in the world, and which enable server 13 to connect with any number of additional field client computing systems 27 connected to those Internet nodes, which may be advantageous to utilize given appropriate security conditions.

LAN connection 21 and Internet connection 23 potentially enable lab 11 to multiply the computing power available to it, with very small additional cost relative to the cost of maintaining its own lab client computing systems 15, in terms of initial capital outlay, ongoing IT administration personnel, and so forth. For example, in the case of developing a natural language feature, the access to widely distributed outside computing systems has enabled a natural language feature to be tested on tens of billions of sentences, and go through a correspondingly large number of experimental software builds, revisions, and performance assurance cycles, within a single release ship cycle. Furthermore, the connections to outside computing systems naturally provide a wide variety of hardware-software configurations that tend to be scarce in the homogeneity of a dedicated lab, but that provide an important sample group representing the variety of real-world machines, for a computing process under development to be tested on.

Depending on security requirements, capabilities, and concerns, the field client computing systems 27 may be limited to computing systems internal to an enterprise involved with the computing feature distributed testing, or may be expanded to be made available to additional groups of users and their computing systems, given security assurances that are appropriate to the task at hand. For example, the feature testing tool distributed to the field client computing systems to manage process instances on the field client computing systems may include a security feature configured to prevent a user of the client computing system from accessing or tampering with the feature testing tool, the computing feature builds that it is testing, or the data sets that are fed for processing to the computing feature builds as part of the process testing.

Illustrative embodiments for methods that may be employed in the context depicted in FIG. 1 are provided as follows, with reference to the subsequent figures.

Figure 2:
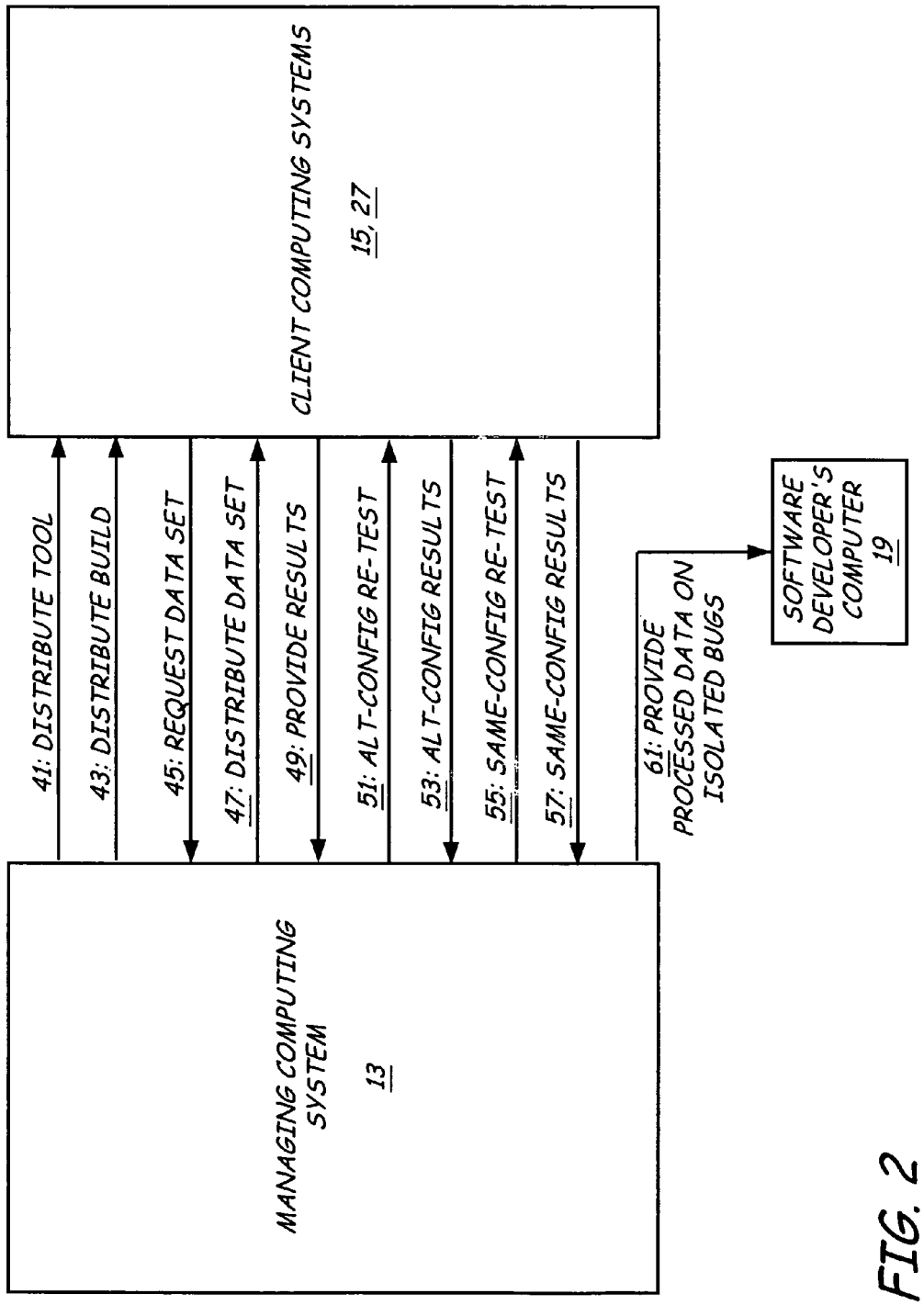
FIG. 2 depicts a simplified, combined block diagram and flowchart of a method involving a managing computing system and client computing systems, according to an illustrative embodiment.
Figure 3:
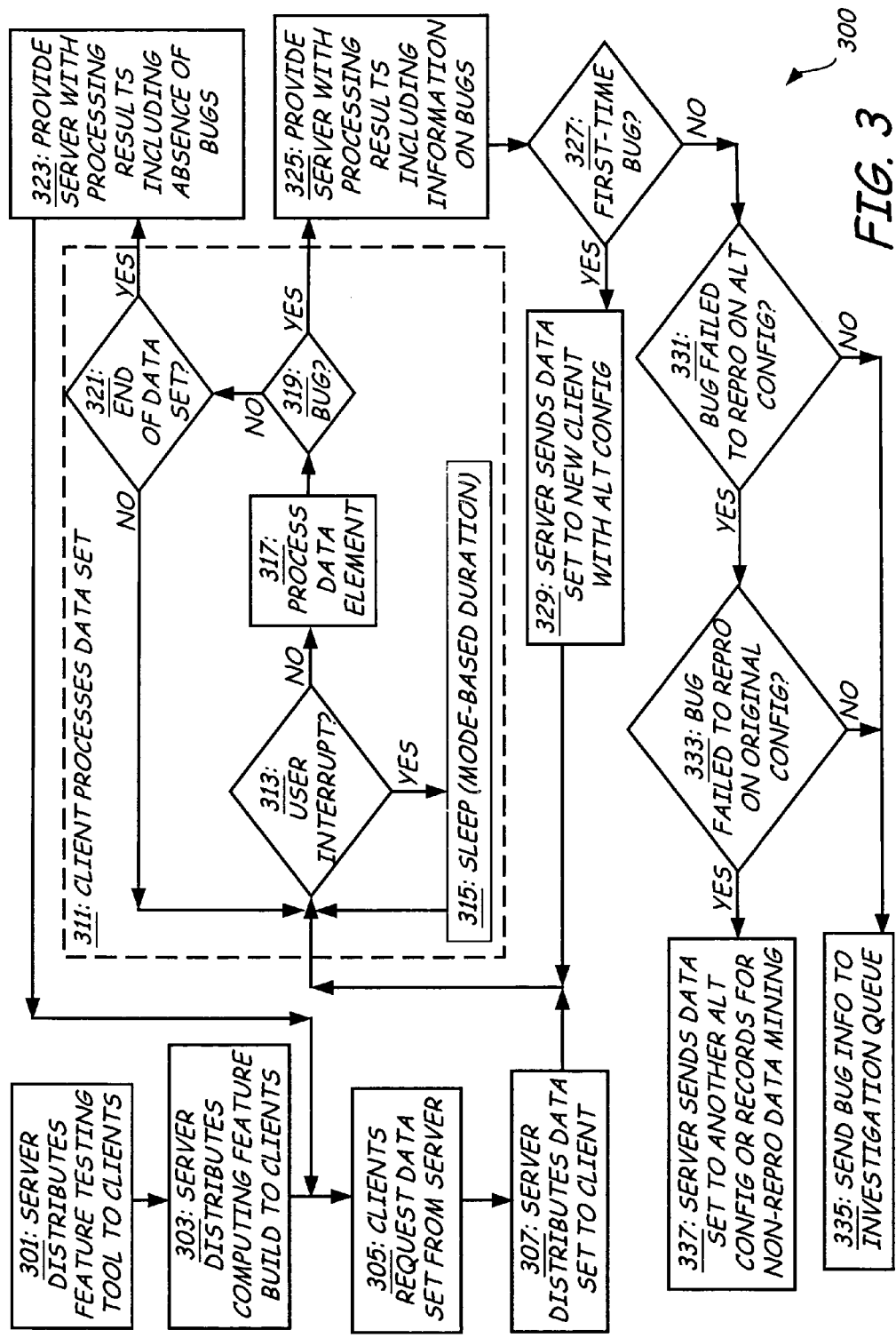
FIG. 3 depicts a flowchart of a method according to an illustrative embodiment.

FIG. 2 depicts a simplified, combined block diagram and flowchart of a method 40 involving a managing computing system 13 and client computing systems 15, 27, according to an illustrative embodiment. Other embodiments may employ other configurations or series of steps, for example. FIG. 3, discussed below, depicts a method embodiment with somewhat greater detail.

Method 40 of FIG. 2 includes a number of steps, organized in an ordered series from top to bottom corresponding to a typical sequence of steps through time, and also indicating the direction of information transfer each of these steps involves between the managing computing system 13 and the client computing systems 15, 27, corresponding in an illustrative embodiment to the illustrative examples of those computing systems in FIG. 1. These steps are discussed as follows.

Step 41 includes distributing a feature testing tool to one or more of the client computing systems 15, 27. The feature testing tool, which may comprise a feature driver, is configured to run a computing process feature, such as a natural language feature, and to observe and report on the behavior and results of the computing process feature. The feature testing tool is also configured to manage the computing process testing on client machines and to coordinate testing with the managing computing system 13. Software updates to the feature testing tool may also automatically be distributed by the managing computing system over time, as they are developed. The feature testing tool may optionally be configured to automatically receive and process the update, then restart itself with the update in effect, without any intervention by a user of the machine it is running on.

Step 43 includes distributing one or more computing feature builds from managing computing system 13 to the client computing systems 15, 27. The computing feature builds are individual software builds or test versions of the computing feature. Software builds may be generated in fairly rapid succession by a developer or development team, with each build incorporating corrections or improvements, particularly as based on lessons learned by testing prior builds. Successive builds of the same computing feature may be distributed iteratively to the client computing systems for further testing as they are developed.

Step 45 includes the feature testing tool on the client computing systems 15, 27 sending a request for a data set to managing computing system 13, after the feature testing tool determines that the client computing system is ready for a new data set. This may be when it determines it has been successfully installed and it has successfully installed its first computing feature build, and is ready for its first data set; or the request may be associated with providing the results of a prior data set test run back to the managing computing system, and a determination that the client computing system is ready for another one, for example.

Step 47 includes distributing one or more data sets from the managing computing system 13 to the client computing systems 15, 27. The data set may be associated with management instructions, and in that context, may be referred to as a test process instance. Data sets provide raw material for the computing processes being tested to process, and are tailored to the type of computing process. For example, data sets may include corpus segments for a natural language feature, protein folding calculations for a molecular biology modeling feature, or quantum mechanical interaction calculations for a quantum mechanical system modeling feature, for example. A wide variety of data sets may be used to try to anticipate a broad range of potential inputs and to try to observe a correspondingly broad range of potential responsive behavior and results from the computing process feature being tested. The managing computing system 13 may provide some of its data sets to field client computing systems to process and some to lab client computing systems, and may process some of the data sets itself, or assign the data sets for test processing in any other combination of computing systems available to it.

Step 49 includes providing results of the processing of the data set by the computing feature build. The results are provided from the client computing systems to the managing computing system. The results are obtained after the feature testing tool has prompted the computing feature build to process the data set and overseen that process, which may include by active management by the feature testing tool. For example, the feature testing tool may govern when it runs during times when the feature testing tool determines that client computing system is not otherwise in active use, to keep itself unobtrusive to a primary user of the client computing system on which it is installed. Different modes for managing run times are further explained below.

As another example, the feature testing tool may observe that the computing feature build has exhibited indications of an error, an assert, an endless loop, or some other kind of erroneous result, in which case the feature testing tool may cut the processing run short, return the computing feature build to a state of readiness, and report back to the managing computing system with information on the erroneous results. Errors, asserts, endless loops, or other erroneous results, which may collectively be termed "bugs" for short-hand, may indicate previously unknown and unanticipated flaws in the computing feature build or in the way it interacts with the hardware and software configuration of its computing environment. Detecting such erroneous results therefore provides vital indicators for the developers of the computing feature to improve its performance for its next build.

Steps 51, 53, 55, and 57 depict optional steps that may be taken in response to the appearance of erroneous behavior in the results of processing of the data sets by the computing feature build, including in response to the reproduction or elusiveness of erroneous results subsequent to their original detection. Other than for their special stages in re-testing, steps 51 through 57 essentially recapitulate the prior steps 47 and 49; they are special cases of distributing data sets to client computing systems, and the client computing systems providing the results back to the managing computing system.

In particular, step 51 is performed in response to receiving indications of erroneous results in a prior data processing instance. Step 51 includes re-distributing a data set associated with erroneous results for a repeat test processing instance on a client computing system that has an alternate hardware-software configuration than that of the client computing system on which the erroneous behavior was originally observed. Step 53 includes providing the results of the processing instance on the client computing system having the alternate hardware-software configuration to the managing computing system 13. The managing computing system may repeat steps 51 and 53 in several iterations, to test for reproductions of the erroneous results across a range of different hardware-software configurations.

Step 55 may be performed particularly if the prior erroneous results could not be reproduced on other hardware-software configurations. Step 55 includes sending the same data set back again to the original client computing system that produced the erroneous results when the computing feature build processed that data set on that computing system. Step 57 includes providing the results of that re-test on the same computing system back to the managing computing system. Through various combinations of these steps, therefore, the managing computing system 13 may record whether the test results include no bugs in a fresh data set (such as a corpus segment in the case of testing a natural language feature), an original bug in a fresh data set, no bugs in a data set sent to a different-configuration remote computing device to try to reproduce a bug, a reproduction of a bug in a data set sent to a different-configuration remote computing device, or a reproduction of a bug sent back to the original remote computing device on which it occurred after failure to reproduce it on a different-configuration remote computing device.

Step 61 includes providing processed data on isolated bugs, gleaned from the iterations of distributing data sets and collecting results, among other steps. The managing computing system 13 may receive and compile the results from the feature driver of another feature testing tool, from the one or more client computing systems, into an integrated test result for the tested build of the computing feature. The processed data on the bugs may be provided, for example, to one or more computing devices 19 of the software developers working on the computing feature and designing a new build of the computing feature based in part on the information they thus receive about the bugs.

FIG. 3 provides further details of how distributed computing for computing process testing may operate, according to an illustrative embodiment. FIG. 3 depicts a flowchart of a method 300, according to an illustrative embodiment. Method 300 shares several aspects in common with method 40 of FIG. 2, and includes further aspects that are discussed in more detail below with reference to FIG. 3.

Analogously to method 40, method 300 begins with step 301 wherein a server, as a managing computing system, distributes a feature testing tool to one or more client computing systems; step 303, wherein the server distributes one or more computing feature builds to the client computing systems; step 305, wherein the client computing systems request data sets from the server as they become ready to process the data sets; and step 307, wherein the server distributes one or more data sets to the client computing systems.

Step 307 may involve, or be preceded by, the managing computer system deriving and preparing the data sets for disbursal to the client computer systems. For example, in an embodiment involving the testing of natural language feature builds, the data sets may include segments derived from a corpus, which may be one of several corpora that are intended for processing by the natural language feature build, and that are accessible to the managing computing system at the time. For the corpora being intended and available to be processed by the natural language feature builds may include considerations of new corpora that are added, as well as old corpora that are removed from accessibility for dividing and distributing for test processing.

Management of the corpora or other data collections may be performed at the managing computing system. Management of the corpora may include adding and removing corpora to and from the set of available corpora, in parallel to preparing and distributing segments of those corpora for process testing. New corpora may be acquired for the project as it is in progress, particularly for languages other than those most commonly used in software applications such as English. Some corpora may be licensed for a limited duration of time, and must be removed from usage by a certain date to comply with contractual obligations. To that end, the managing computing system may also send indicated time limits with the corpus segments to the client computing systems, so that if one of the client computing systems takes longer than expected to complete process testing of the corpus segment it is provided, the client computing system can terminate usage of that corpus segment at the agreed date and return the results thus far obtained, to further ensure compliance with contractual terms involved in licensing the corpus.

Management of the corpora may also include organizing the corpora currently in service in a cyclical queue, to ensure relatively even distribution and usage of the corpora, to encourage a wide variety of corpora that the natural language feature builds are exposed to in the process testing. Each data set prepared for distribution may be assigned a priority associated with the duration of time since it was last distributed for test processing by a computing feature build, with new data sets that have never yet been distributed for test processing marked as having an infinite duration since they were last used, therefore putting them at the highest priority for subsequent distribution.

The cyclical queue may also be used to deal with erroneous results, which may be placed at the front of the cyclical queue, ahead of all data sets in the queue without a currently unresolved association with erroneous results. The criteria for distribution of the data sets associated with an unresolved erroneous result may also be ordered with additional criteria for further distribution. This is discussed further in a later section, with reference to steps 327 et seq., below.

Method 300 further includes test processing block 311 wherein a representative one of the client computing systems processes one of the data sets. In client processing block 311, the client computing system may first iteratively performs step 313, associated with a primary user accommodation protocol, of checking whether there is an indication of user activity that interrupts the processing of the data set. The computing feature distributed testing method may include distribution of test process instances to a combination of dedicated lab client computers and remote or field client computers with primary users who use the client computers primarily for tasks unrelated to the test process instances. In the case of such a combination, the management instructions includes separate instructions so that dedicated lab client computers do not concern themselves with primary user accommodation protocols, while the field client computers employ any of a variety of accommodation protocols to run only during the times when it determines that the client computing system is not otherwise in active use, and thereby accommodate itself to the activity of the primary user of the client computer and remain unobtrusive to the primary user. This step is discussed further as follows.

Step 313 helps ensure that the feature testing tool runs itself on the client computing system during times when the feature testing tool determines that the client computing system is not otherwise in active use. It does this because it is likely not to be run as the highest priority task on a typical one of the client computing systems, but rather run in a background mode or cycle scavenging mode that uses that computing system when it is left inactive by its primary user, but remains passive and does not interfere with the primary user's activity on the computing system when the primary user is actively using it. An activity management mode may be referred to as "cycle scavenging" as a reference to scavenging unused processing power of a computer in terms of its clock cycles during periods of inactivity, without intruding on the processing power of the computer for other tasks, such as those used by the computer's primary user. By running on a background or cycle scavenging mode, the feature testing tool becomes a practical possibility to run on many potential candidate field client computing systems with primary users that need unimpeded use of the computing systems during substantial fractions of time, but who do not require the computing system's activity during substantial fractions of time and would likely otherwise leave the computing systems' computing power idle during those times.

A variety of modes of primary user accommodation, including what indications are used to trigger inactivity in deference to the primary user and what methods are used to determine the primary user's absence and to trigger a re-start of the feature testing tool, may be used. The options for these accommodation modes range from simple to more sophisticated and from passive to more pro-active.

For example, one option for the primary user accommodation mode is simply to allow the primary user of a client computing device to use a user interface for the tool to input her weekly schedule of usage of the computing device at the time she accepts the feature testing tool for installation on the computing device, or to enter or modify her schedule at any time thereafter. For example, this particular computer user may input that she generally uses her computer between 8:00 AM and 5:00 PM Monday through Friday. The feature testing tool may then activate itself for active execution and testing of computing feature builds, for example as a background system tray application, for a given duration of time after the primary user's scheduled usage, such as at 5:15 PM every weekday evening, and end its active execution at 7:45 AM every weekday morning. This scheduling mode could be paired with a direct usage detector, so that if at any time, a user input has been detected by the computer through a user input device, such as a keyboard or mouse, the feature testing tool remains dormant for a duration, such as fifteen minutes, from the occurrence of the last detected user input before resuming active execution and testing of a computing feature build.

If an input happens to be detected in the middle of a process instance, the feature testing tool could quickly organize as necessary to suspend the testing process, such as by finishing the single sentence a natural language feature is in the middle of processing when the user input is detected, and then put the process instance into a sleep mode, to continue where it left off at the appropriate indication of user absence. The duration of the input-responsive dormancy may be selectable by the primary user, much in the same way that the inactivity pendency time for a screensaver is, in an illustrative embodiment.

In a more pro-active cycle scavenging mode, the feature testing tool will initiate process instance testing activity after a duration of user input inactivity during all times of day and night; but with different threshold durations of input inactivity, thereby continuing to apply intelligent accommodation of the primary user. For example, the feature testing tool may apply a relatively shorter input inactivity threshold during scheduling blocks when the primary user is indicated to be away, such as during the off-hours in the nights and weekends mentioned above, while still also applying a relatively longer input inactivity threshold during scheduling blocks when it is indicated that the primary user is expected to be present. Applying such a longer threshold duration during periods of the primary user's expected presence may largely avoid the otherwise statistically likely occurrences of the process instance testing being initiated when the user just happened to be away from her computer for a short period, while also allowing some advantage to be taken from the likely inevitable occurrences of the user being in fact absent when the available scheduling indicators predict her to be present, such as if the user has a sick day, or leaves on vacation without remembering to so indicate on scheduling indicators available to the feature testing tool.

The relative inconvenience of the feature testing tool requiring its own dedicated scheduling indicators for the user to deal with to support the accommodation protocol may be solved with other embodiments that rely on already existing predictive or empirical indicators of the primary user's periods of usage, that may be made available to the feature testing tool. For example, many users make use of a personal or collaborative scheduling utility, which may run alone or, more commonly, as part of a package. The feature testing tool may be enabled, if the primary user so selects, to query scheduling objects used by an information manager or scheduler application used by the primary user. For example, a user may have entered a set schedule of normal usage ending at 5:00 PM every weekday evening, but then go through a temporary period where she is using the computer until about 7:00 PM every weekday evening. She may choose to open the user interface for the feature testing tool and manually change her schedule. However, the testing tool could also accommodate the different schedule without the manual change, such as with the automatic delay after any user input as described above, or by reading scheduling objects reflecting the altered time frame in the user's scheduling management application, for example.

Other, empirical indicators of the primary user's absence in the present and likely into the immediate future may be easily available to a computing system over a network. For example, a user's activity may involve regular usage of alternative computers besides the one on which the feature testing tool is installed, and that are more or less remotely located compared to the computer on which the feature testing tool is installed, but still in communicative connection with that computer. For example, the primary user may log into a computer elsewhere on a network, or may enter a unique password elsewhere on the network, such that the computer on which the feature testing tool is installed is able to receive indications over the network of the logging in or the unique password usage at the remote computer. These indicators of the primary user presently being at the remote location of that other computer may be used, alone or in combination with the other methods discussed herein, to characterize or predict periods of the user's likely usage of the computer on which the feature testing tool is installed.

For instance, the feature testing tool may have been inactive during a period indicated to be regular business hours, and when the primary user has no cause for absence at the present moment indicated in his scheduling application, when the feature testing tool unexpectedly receives an indication that the primary user has logged onto another computer connected over a local area network (LAN), the other computer indicated to be in a different building at a considerable distance. The feature testing tool may then override a long-duration user inactivity threshold normally engaged during periods when the user is otherwise indicated to be likely to use the computer on which the feature testing tool is installed, and instead either switch to a short-duration user inactivity threshold normally engaged when the user is indicated to be absent, or simply go directly to initiating a process instance.

Using accommodation mechanisms such as these, the primary user never needs to enter scheduling information as a separate input to the feature testing tool, but the feature testing tool can take full opportunity of the user's principal scheduling application to run process instances in the more proactive, user-absent modes during times when the scheduling objects indicate the primary user is absent, such as at lunch, in a meeting, or away at a conference, whether the scheduling information is entered by the user or by the user's co-workers. This mechanism may therefore optimize both the total processing time the feature testing tool is able to get from the user's client computer, and the user's ability to continue using her computer with minimal if any noticeable obtrusion by the feature testing tool, with minimal effort or attention.

When the primary user is indicated to be absent, or that any accommodation protocol is otherwise satisfied; the step 313 of the potential user accommodation interrupt can be answered with a "no", and succeeded by the step 317 of processing the next available data element in the current test process instance, in the illustrative embodiment of method 300. A data element may be, for example, a sentence from a corpus, in the context of testing a natural language feature build. The feature testing tool observes the behavior of the computing feature build and evaluates whether it exhibits any erroneous behavior, i.e. a bug, when processing that data element, as in step 319.

A natural language feature may be any of a wide variety of features that perform some kind of natural language processing task on a sentence or other unit of a human language. Some common natural language processing features that are familiar to a great many users include a spelling checker, a grammar checker, a thesaurus, and a suggested correction list, for example. Many other natural language features are also used or are currently under development. Any natural language feature may be tested according to the methods and systems discussed herein, as may any other type of computing process feature. Some other examples of natural language features that may advantageously be tested and proofed by methods and systems disclosed herein, including more and less familiar examples, include a style checker, a hyphenator, a summarizer, a dictionary, a translation feature, an alternative font, an input method editor, a part-of-speech tagger, a tokenizer, a chunker, a word breaker, a parser, an inconsistent parse alerter, a script version converter, a pronunciation displayer, a stroke count displayer, a language detector, and a non-native language usage detector. Some of these are readily familiar.

An alternative font may be of particular concern for scripts in some languages where substantial differences in font exist that may affect language meaning if not handled correctly. Input method editors are of particular concern to some languages that do not have standard user input devices for the language or for a particular script in which the language is typically used, or for which standard user input devices are not very convenient. These may include languages with thousands of different characters, such as Chinese. Stroke count displayers are also of particular importance in some Asian logographic languages such as Chinese, in which, for example, each character may have anywhere from one to fourteen or more strokes, and dictionaries may be referenced by a radical index based on a stroke count radical chart.

Script version converters may also be of particular concern to languages that are typically written in any of more than one standardized scripts, of which Chinese is again an example. Chinese is commonly written in either a traditional script or a simplified script. Both scripts have official support. The traditional script is supported by the government of the Republic of China, and is used by the Hong Kong and Macau Special Administrative Regions of the People's Republic of China, for example. The simplified script is supported by the governments of the People's Republic of China and Singapore, as well as by the Library of Congress and the American Library Association, for example. Furthermore, Chinese is also often written in variants of Latin script such as Hanyu Pinyin and Tongyong Pinyin. Additional languages in which script converters may be important include Japanese, in which the language may be written in any of the Kanji, Hiragana, or Katakana scripts, or the Latin script variant of Romaji; Korean, which may be written in either the Hanja or Hangul scripts; or Hindi and Urdu, which may are traditionally written in the Devanagari and Nastaliq scripts, respectively, but may be readily legible by speakers of the other language if rendered into the other script. Several other Asian languages may have particular usefulness for script converters, such as between the Kannada and classical Tulu scripts for Tulu, or between Todo, Latin, Cyrillic, and classical Mongolian scripts for Mongolian, all of which are or have recently been officially used for Mongolian in either Mongolia or the People's Republic of China. European languages may also have special use for script converters, such as for Serbian, which has traditionally been written in both Latin and Cyrillic scripts.

Part-of-speech taggers, tokenizers, chunkers, parsers, and inconsistent parse alerters are important for analyzing natural language and as a basis for additional natural language processing features. Word breakers are of particular usefulness for languages, again such as Chinese, in which sentences may include words formed out of characters that may stand for words on their own, but are not separated by spaces and must be understood from context.

Natural language features that deal with any human language may be tested with computing feature distributed testing methods and systems as disclosed herein. Some of the languages more commonly dealt with for natural language software application features include Arabic, Basque, Bulgarian, Catalan, Simplified Chinese, Traditional Chinese, Croatian, Czech, Danish, Dutch, English, Estonian, Finnish, French, Galician, German, Greek, Gujarati, Hebrew, Hindi, Hungarian, Icelandic, Indonesian, Irish Gaelic, Italian, Japanese, Kannada, Korean, Latvian, Lithuanian, Marathi, Bokmal Norwegian, Nynorsk Norwegian, Polish, Brazilian Portuguese, European Portuguese, Punjabi, Romanian, Russian, Serbian, Slovak, Slovenian, Spanish, Swedish, Tamil, Telugu, Thai, Turkish, Ukranian, Vietnamese, and Welsh. However, less commonly used languages, including any of the estimated 6,900 or so living languages currently spoken in the world, along with any dead languages or scripts, such as Akkadian or Linear B, for example, and any constructed languages, such as Esperanto or Lojban, for example, may also be the subject of natural language feature development that may benefit from computing feature distributed testing methods and systems as disclosed herein.

Continuing with the example of testing a natural language feature, after each sentence is processed without a bug being observed, the feature testing tool may check whether it is the end of the data set and whether there are any new indications of a user input interrupt, as in steps 321 and 313, respectively, before engaging the natural language feature build to process the next sentence. Indications of the end of the data set or a user interrupt may be susceptible of being receiving passively without the feature testing tool having to take any active step of checking for them after each sentence, with steps 321 and 313 in this flowchart representing the potential for passively receiving such an indication rather than having to take any active steps, in one embodiment. If the entire data set, such as a corpus segment, is processed without any indications of bugs, then the feature testing tool provides processing results such as information on the process instance and the indication of bug-free operation to the server acting as the managing computing system, in this illustrative embodiment, as in step 323. If a bug is indicated, such as an error, an assert, an infinite loop, or other erroneous behavior, the feature testing tool may shut down the process instance and report the processing results including information about the erroneous behavior to the server, as in step 325.

If the bug reported by a feature testing tool in step 325 is a first-time appearance of the given bug, the managing computing system prepares to try to reproduce the bug on another client computing system with a different hardware-software configuration than the one on which the bug was first observed, as in step 329. It may do this iteratively with several hardware-software configurations, to be able to compare how all of them behave with the same computing feature build processing the same data set.

It may be advantageous for the managing computing system to arrange to try to reproduce the error quickly, so it may assign the data set associated with the erroneous results a higher priority in the queue than any of the data sets not associated with an unresolved erroneous result, so that it will take top priority. The managing computing system may also assign the data set associated with the error a mandate, parallel to its high priority, for that data set to be sent to a second client computing system which has a different hardware-software configuration than that of the client computing system that originally reported the erroneous results, or that previously reproduced the erroneous results, in the case of an already reproduced error under repeated investigation. The parallel mandate for a different hardware-software configuration may result in the data set associated with the erroneous result being preceded for distribution to the next available client computing system, if the next one that happens to be available is the client computing system that already produced the erroneous result, or one that has an identical or similar hardware-software configuration to the client computing system that already produced the erroneous result.

The different hardware-software configuration that the erroneous result is mandated to be sent to should include, for example, at least one of a different type of central processing unit, a different clock speed, a different amount of random access memory (RAM), a different operating system, a different operating system version, a different set of concurrently loaded software, a different set of concurrently running software, or a different set of concurrently running processes, as the client computing system that previously produced the erroneous behavior.

After the managing computing system receives results from the second (or later) client computing system, it may compare to see if the erroneous results were reproduced on the second client computing system, as in step 331. If the erroneous behavior was not reproduced on the alternate hardware-software configuration, the managing computing system may respond by sending the data set associated with the erroneous results back to the client computing system that originally reported the erroneous results, as in step 333. If the erroneous behavior was not reproduced on the alternate hardware-software configuration, the managing-computing system may respond by providing the data set associated with the erroneous results, along with information about how the erroneous results were produced and reproduced, including whether the erroneous results could be reproduced with the different hardware-software configuration, to an investigation queue, as in step 335.

After a data sequence is sent to the investigation queue, along with an indication of which computing feature build produced the erroneous behavior when processing that data set (if necessary), the data set is iteratively divided into increasingly smaller sections or divisions and the computing feature build engaged to process those smaller divisions. In general, it will process one of the divisions successfully but reproduce the erroneous behavior when processing the other division, making the iterative divisions an effective mechanism for narrowing down the source of the error to the smallest data section that can be isolated. This may be a single sentence from a corpus sample, for example, in the context of testing a natural language feature. Once this smallest data sample causing the erroneous behavior has been isolated, it and other relevant information about the circumstances of the observation and reproductions of the error may be provided as output of the computing feature distributed testing, to an output, such as software developer's computer 19 in FIG. 1, for the involved software developers to examine.

It may happen that an error that is consistently reproduced on a data sample or a division of a data sample cannot be reproduced on any smaller divisions of the data sample or division. This may happen, for example, when one data sample incurs a partial memory corruption in the computing feature build, and a subsequent data sample in the original sequence targets the corrupted memory location and completes the prompt of the erroneous behavior, but either data sample by itself will not cause any detectable error. This may even happen with a complex of three or more data samples required to be processed in a certain order to sequentially corrupt a memory location until it develops into an observable error, but which do not produce any observable error if they are not all processed in their original sequence. If an orderly division into smaller data sections does not reproduce an error that is reproducible at the larger data scale, then testing may be done on out-of-order permutations of the data sections. This may be done until the smallest out-of-order sequence of sections from the data sample is identified and isolated that still reproduces the error. This out-of-order permutation and the information on the history of the investigations into its erroneous behavior may then be provided via an output to the software developers associated with the computing feature distributed testing project.

If an erroneous result cannot be reproduced on an alternate hardware-software configuration as the one on which it was originally observed, the associated data set may be sent back to the original client computing system on which the erroneous behavior was observed. This may happen if, for example, the error is due to race conditions in the computer, where the tool engages in multiple simultaneous processing tasks, which may reach a set of stages that interact catastrophically in one machine, but which reach those stages at different times on a different machine that runs at a different speed, and so avoid the catastrophic interaction. If an erroneous result fails to reproduce at all, even on the original client computing system, the information on its earlier observation is still logged. All the information on the observed erroneous behaviors, what hardware-software configurations they were observed on, under what conditions they were reproduced or failed to be reproduced, and so forth, may be tracked and data-mined by the managing computing system, to see if any additional clues or larger trends may be detected, toward the goal of being able to understand and predict the conditions for all observed errors, and assisting the involved software developers to prevent as much potential for error as possible in future builds of the computing process feature.

Because of the importance of detecting, testing, and comparing observed errors on a variety of hardware-software configurations that provide a fairly representative sample of the real-world variety of settings under which the computing feature might be used over its lifetime, the managing computing system may also be provided with a function for seeking out, identifying, and promoting the addition to the distributed testing project of new client computing systems that have a hardware-software configuration that was either absent or underrepresented among the client computing systems that had previously been involved with the distributed testing project. This may include, for example, the managing computing system evaluating indications of the hardware-software configurations of computing systems and devices that have connections to its local area network or campus area network, sending emails to or prompting an involved developer to contact primary users or administrators of preferred new client computing systems such as those with previously absent or underrepresented hardware-software configurations, and distributing the feature testing tool for installation on the new client computing systems for those computing systems that are available or whose primary users agree to the installation.

Using some of the wealth of computing processing power that may lie available much of the time within communicative availability of computing systems involved in computing, feature testing has the potential to exponentially expand the amount of testing and verifying that a computing feature is put through for a given release. For example, it is anticipated that a fairly moderate project of computing feature distributed testing will enable successive builds of a given computing feature to be engaged to process over a billion data elements of its test data sets prior to public release of a computing feature based on the successive computing feature builds.

For example, in the context of natural language features, each of those data elements could be a sentence from a corpus, and successive builds of a natural language feature are anticipated to be able to be engaged to process a number of sentences in the billions or tens of billions within a typical timespan for a new public release or version of the natural language feature. Each identified and/or isolated error may be used to characterize erroneous results or other performance aspects of the computing feature build, and analyzed by the involved developers to revise a given computing feature build to create a subsequent build of the computing feature that has been revised to eliminate the capacity for the erroneous results, and otherwise improve the performance aspects that were identified in the prior computing feature build, through the results provided by the client computing systems.

Figure 4:
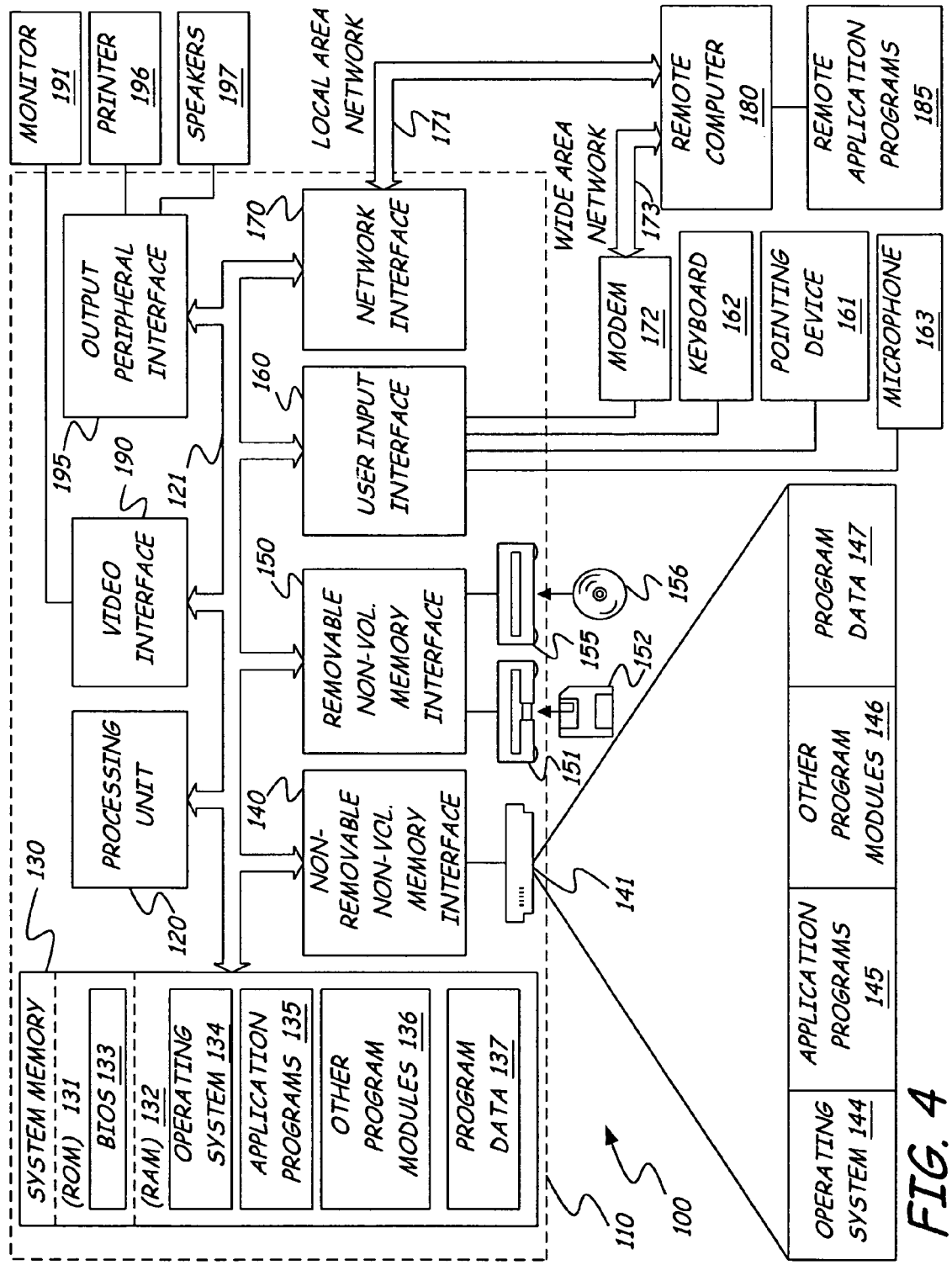
FIG. 4 depicts a block diagram of one computing environment in which some embodiments may be practiced.

FIG. 4 illustrates an example of a suitable computing system environment 100 on which embodiments may be implemented. The computing system environment 100 is only one example of a suitable computing environment and is not intended to suggest any limitation as to the scope of use or functionality of the claimed subject matter. Neither should the computing environment 100 be interpreted as having any dependency or requirement relating to any one or combination of components illustrated in the exemplary operating environment 100.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

As described herein, such executable instructions may be stored on a medium such that they are capable of being read and executed by one or more components of a computing system, thereby configuring the computing system with new capabilities. In the context of the discussion above, these may include, for example, the capability for a server to provide corpus segments over a network to computing system clients; for clients to receive the corpus segments, to execute a feature driver that runs a natural language feature on the received corpus segment and tests for any indications of erroneous behavior by the natural language feature, and to provide results from the feature driver to the server; and for the server to receive and compile the results from the feature driver from the one or more clients into an integrated test result for the natural language feature, according to one illustrative embodiment.

With reference to FIG. 4, an exemplary system for implementing some embodiments includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media; removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 4 illustrates operating system 134, application programs 135, other program modules 136, and program data 137.

The computer 110 may also include other removable/non-removable volatile/nonvolatile computer storage media. By way of example only, FIG. 4 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 4, provide storage of computer readable instructions, data structures, program modules and other data for the computer 110. In FIG. 4, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 4 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 4 illustrates remote application programs 185 as residing on remote computer 180. It will be appreciated that the network connections shown are exemplary and other means of establishing a communications link between the computers may be used.

Figure 5:
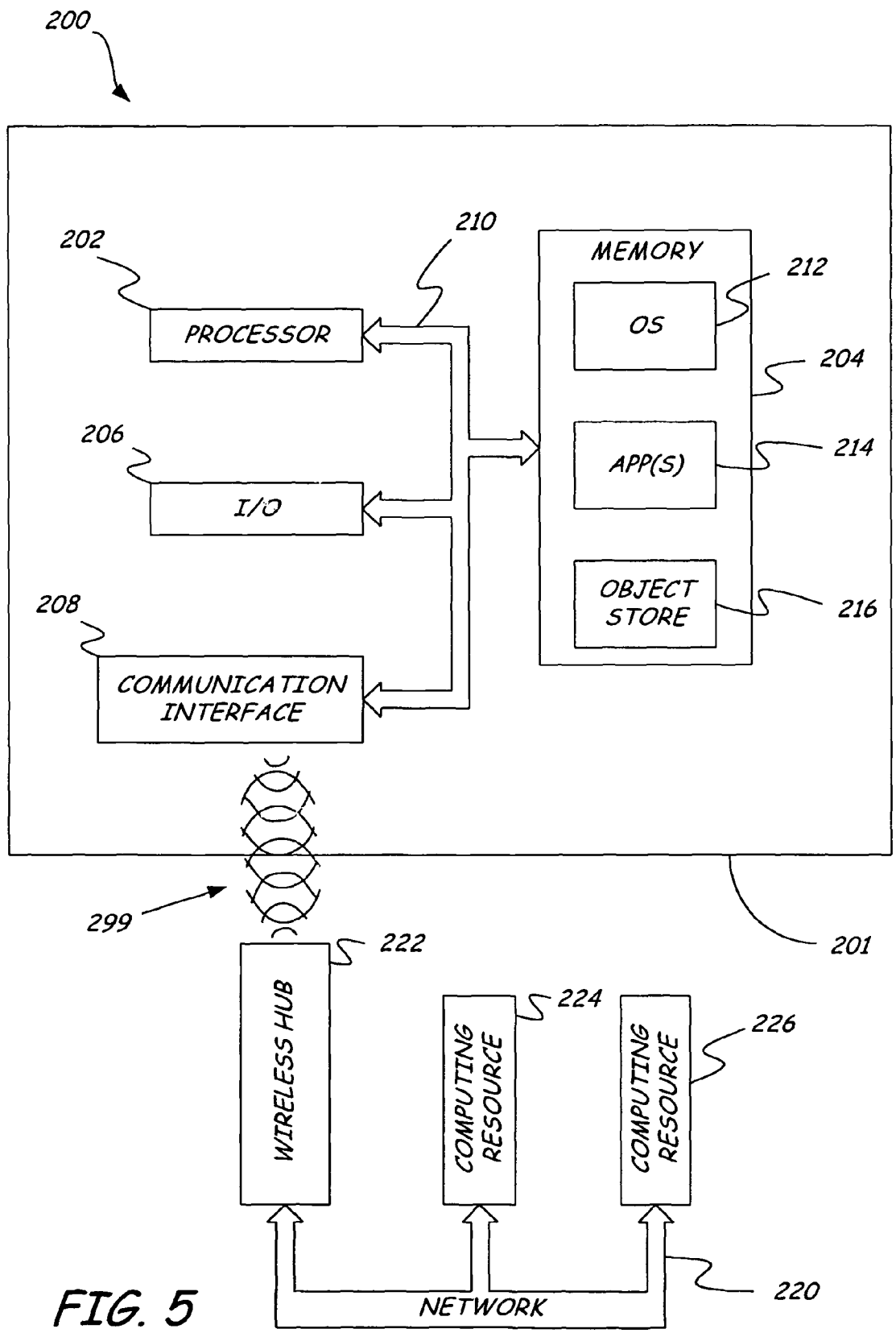
FIG. 5 depicts a block diagram of an alternative computing environment in which some embodiments may be practiced.

FIG. 5 depicts a block diagram of a general mobile computing environment, comprising a mobile computing device and a medium, readable by the mobile computing device and comprising executable instructions that are executable by the mobile computing device, according to another illustrative embodiment. FIG. 5 depicts a block diagram of a mobile computing system 200 including mobile device 201, according to an illustrative embodiment, such as might be particularly useful for the software developer's computing device 19, for example. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is illustratively allocated as addressable memory for program execution, while another portion of memory 204 is illustratively used for storage, such as to simulate storage on a disk drive.

Memory 204 includes an operating system 212, application programs 214 as well as an object store 216. During operation, operating system 212 is illustratively executed by processor 202 from memory 204. Operating system 212, in one illustrative embodiment, is a WINDOWS® CE brand operating system commercially available from Microsoft Corporation. Operating system 212 is illustratively designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200.

Mobile computing system 200 also includes network 220. Mobile computing device 201 is illustratively in wireless communication with network 220—which may be the Internet, a wide area network, or a local area network, for example—by sending and receiving electromagnetic signals 299 of a suitable protocol between communication interface 208 and wireless interface 222. Wireless interface 222 may be a wireless hub or cellular antenna, for example, or any other signal interface. Wireless interface 222 in turn provides access via network 220 to a wide array of additional computing resources, illustratively represented by computing resources 224 and 226. Naturally, any number of computing devices in any locations may be in communicative connection with network 220. Computing device 201 is enabled to make use of executable instructions stored on the media of memory component 204, such as executable instructions that enable computing device 201, to run a feature testing tool to prompt a computing feature build to process data sets, and collects results from the processing of the data set, including any erroneous results, or receiving information on isolated bugs or performance aspects of a computing feature build, in a few illustrative embodiments.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. As a particular example, many illustrative embodiments are discussed herein in terms of natural language feature testing using data sets comprising corpus segments, while these are for illustrative examples of computing process features and data sets, and are not presented by way of limiting the types of computing process features and data sets that may be involved. As another particular example, while the term "computer" "computing device", or "computing system" is herein sometimes used alone for convenience, it is well understood that these could each refer to any computing device, computing system, computing environment, mobile device, or other information processing component or context, and is not limited to any narrow interpretation of any of the terms to refer only to, for example, a traditional desktop computer.

What is claimed is:

1. A computer-implemented method comprising:
distributing a feature testing tool to one or more client computing systems;
distributing one or more computing feature builds from a managing computing system to the client computing systems;
distributing one or more data sets from the managing computing system to the client computing systems,
wherein the data sets are selected for distribution based on their priority in a cyclical queue of data sets,
wherein the managing computing system responds to erroneous results received from a first client computing system by assigning a mandate for a data set associated with the erroneous results to be sent to a second client computing system which has a different hardware-software configuration than that of the client computing system that originally reported the erroneous results, wherein the different hardware-software configuration comprises at least one of a different type of central processing unit, a different clock speed, a different amount of random access memory (RAM), a different operating system, a different operating system version, a different set of concurrently loaded software, a different set of concurrently running software, and a different set of concurrently running processes, wherein the managing computing system receives results from the second client computing system, and, if the erroneous results were not reproduced on the second client computing system, responds by sending the data set associated with the erroneous results back to the client computing system that originally reported the erroneous results, and wherein the managing computing system responds to receiving a reproduction of the erroneous results by providing the data set associated with the erroneous results, along with information about how the erroneous results were produced and reproduced, including whether the erroneous results could be reproduced with the different hardware-software configuration, to an investigation queue;

running the feature testing tool on a given one of the client computing systems during times when the feature testing tool determines that the client computing system is not otherwise in active use, wherein the feature testing tool prompts the computing feature build to process one of the data sets, and collects results from the processing of the data set, including any erroneous results; and providing to the managing computing system the results from the computing feature build processing the data sets on the client computing systems.

2. The method of claim 1, further comprising distributing a new one of the data sets from the managing computing system to one of the client computing systems after the client computing system provides the results from the computing feature build processing the previous data set to the managing computing system, wherein the feature testing tool on the client computing system prompts the computing feature build to process the new data set.

3. The method of claim 1, wherein the managing computer system derives the data sets as segments from a larger data collection, selected from among one or more data collections intended for processing by the computing feature build that are accessible to the managing computer system.

4. The method of claim 1, wherein each of the data sets in the queue has a priority based at least in part on a duration of time that has passed since a most recent occurrence of that data set being processed by a computing feature build.

5. The method of claim 4, further comprising adding data segments to the queue and removing data segments from the queue while the queue is in active use, wherein data sets newly added to the queue are prioritized above the data sets that have been processed at least once by a computing feature build.

6. The method of claim 4, wherein the managing computing system responds to erroneous results by assigning the data set associated with the erroneous results a higher priority in the queue than any of the data sets not associated with an unresolved erroneous result.

7. The method of claim 1, wherein the data sets provided to the investigation queue are iteratively divided into smaller segments, and the divided segments processed by the computing feature build, until the one or more smallest segments of the data set that reproduce the erroneous results are isolated, and information about the erroneous results and the isolated segments is provided.

8. The method of claim 7, wherein if the erroneous results are not reproduced by any of the divided segments individually, then out-of-order permutations of the divided segments are processed by the computing feature build until one or more smallest out-of-order permutations of the divided segments that reproduce the erroneous results are isolated.

9. The method of claim 1, further comprising identifying preferred new client computing systems that had not previously received the feature testing tool, and distributing the feature testing tool to one or more of the preferred new client computing systems.

10. The method of claim 9, wherein the preferred new client computing systems comprise client computing systems that have a hardware-software configuration that was either absent or underrepresented among the client computing systems that had previously received the feature testing tool and provided results to the managing computing system.

11. The method of claim 1, wherein the computing feature build comprises a natural language feature, comprising one or more of: a spelling checker, a grammar checker, a style checker, a hyphenator, a thesaurus, a suggested correction list, a summarizer, a dictionary, a translation feature, an alternative font, an input method editor, a part-of-speech tagger, a tokenizer, a chunker, a word breaker, a parser, an inconsistent parse alerter, a script version converter, a pronunciation displayer, a stroke count displayer, a language detector, or a non-native language usage detector.

12. The method of claim 1, wherein the computing feature build comprises a natural language feature, in one or more languages selected from among Arabic, Basque, Bulgarian, Catalan, Simplified Chinese, Traditional Chinese, Croatian, Czech, Danish, Dutch, English, Estonian, Finnish, French, Galician, German, Greek, Gujarati, Hebrew, Hindi, Hungarian, Icelandic, Indonesian, Irish Gaelic, Italian, Japanese, Kannada, Korean, Latvian, Lithuanian, Marathi, Bokmål Norwegian, Nynorsk Norwegian, Polish, Brazilian Portuguese, European Portuguese, Punjabi, Romanian, Russian, Serbian, Slovak, Slovenian, Spanish, Swedish, Tamil, Telugu, Thai, Turkish, Ukranian, Vietnamese, or Welsh.

13. The method of claim 1, wherein the feature testing tool determines that the client computing system is not otherwise in active use at least in part by consulting an anticipated usage schedule previously entered by a primary user of the client computing system.

14. The method of claim 1, wherein the feature testing tool determines that the client computing system is not otherwise in active use at least in part by consulting with calendar data from an information manager associated with a primary user of the client computing system.

15. The method of claim 1, wherein the feature testing tool determines that the client computing system is not otherwise in active use at least in part by consulting network-available indications that a primary user of the client computing system is in a remote location from the client computing system.

16. The method of claim 1, further comprising:
collecting on the managing computing system the results of the computing feature build processing the data sets, and thereby characterizing performance aspects of the computing feature build; and
distributing a revised computing feature build to the one or more client computing systems, wherein the revised computing feature build has been revised to improve one or more of the performance aspects that were identified in the prior computing feature build through the results provided by the client computing systems.

17. A computing system comprising a processor capable of executing instructions from a memory and configured to:
  distribute a natural language testing utility to one or more remote computing devices having a variety of different hardware-software configurations; iteratively distribute test versions of a natural language feature to the remote computing devices;
  iteratively distribute corpus segments from a cyclical queue of corpus segments to the remote computing devices to test the natural language feature on
    wherein the corpus segments are selected for distribution based on their priority in the cyclical queue of corpus segments,
    wherein a managing computing system responds to erroneous results received from a first remote computing device by assigning a mandate for a corpus segment associated with the erroneous results to be sent to a second remote computing system which has a different hardware-software configuration than that of the client computing system that originally reported the erroneous results, and
    wherein the different hardware-software configuration comprises at least one of a different type of central processing unit, a different clock speed, a different amount of random access memory (RAM), a different operating system, a different operating system version, a different set of concurrently loaded software, a different set of concurrently running software, and a different set of concurrently running processes;
  iteratively receive test results from the remote computing devices;
  record whether the test results include no bugs in a fresh corpus segment, an original bug in a fresh corpus segment, no bugs in a corpus segment sent to a different-configuration remote computing device to try to reproduce a bug, a reproduction of a bug in a corpus segment sent to a different-configuration remote computing device, or a reproduction of a bug sent back to the original remote computing device on which it occurred after failure to reproduce it on a different-configuration remote computing device;
  send data segments with reproduced bugs to an investigation queue and run the natural language feature iteratively on increasingly smaller divisions or sequences of divisions of the data segments until the bug is isolated; and
  provide information on the isolated bugs to support debugging the natural language feature.

18. A non-transitory computer storage medium comprising executable instructions capable of being read and executed by one or more components of a computing system to implement the computing system of claim 17.

* * * * *

UNITED STATES PATENT AND TRADEMARK OFFICE
CERTIFICATE OF CORRECTION

| | | |
|---|---|---|
| PATENT NO. | : 7,823,138 B2 | Page 1 of 1 |
| APPLICATION NO. | : 11/599022 | |
| DATED | : October 26, 2010 | |
| INVENTOR(S) | : Carlos A. Arguelles et al. | |

It is certified that error appears in the above-identified patent and that said Letters Patent is hereby corrected as shown below:

In column 21, line 13, in Claim 17, delete "on" and insert -- on, --, therefor.

Signed and Sealed this
First Day of February, 2011

David J. Kappos
*Director of the United States Patent and Trademark Office*